US005774225A

United States Patent [19]

Goldstein et al.

[11] Patent Number: 5,774,225

[45] Date of Patent: Jun. 30, 1998

[54] SYSTEM AND METHOD FOR COLOR MEASUREMENT AND CONTROL ON-PRESS DURING PRINTING

[75] Inventors: Michael D. Goldstein, Herzlia; Noam Noy, Netanya; Roy Tenny, Ramat Hasharon, all of Israel

[73] Assignee: Advanced Vision Technology, Ltd., Herzelia, Israel

[21] Appl. No.: 624,886

[22] Filed: Mar. 27, 1996

[51] Int. Cl.[6] .......... G01J 3/46

[52] U.S. Cl. .......... 356/402

[58] Field of Search .......... 356/402–411; 250/226; 364/526; 101/DIG. 45

[56] References Cited

U.S. PATENT DOCUMENTS

| | | | |
|---|---|---|---|
| 4,289,405 | 9/1981 | Tobias | 356/407 |
| 5,118,183 | 6/1992 | Cargill et al. | 356/406 |
| 5,163,012 | 11/1992 | Wuhrl et al. . | |
| 5,182,721 | 1/1993 | Kipphan et al. | 364/526 |
| 5,446,543 | 8/1995 | Nakagawa et al. | 356/405 |
| 5,460,090 | 10/1995 | Pfeiffer et al. . | |
| 5,543,922 | 8/1996 | Runyan et al. | 356/402 |

*Primary Examiner*—K. Hantis

*Attorney, Agent, or Firm*—Wilson Sonsini Goodrich & Rosati

[57] ABSTRACT

A method for color measurement and control and a color measurement and control system for determining during printing, on-press, the color value of at least one location on a printed substrate. The color measurement and control system includes a camera for acquiring an image of an area of the printed substrate, a color measurement device for measuring a color value of a location of the printed substrate, the color measurement device and the camera are operating substantially simultaneously, and a processing unit for receiving the image captured by the camera and the color measurement and for providing a position of the location with respect to the image employing the image itself. The processing unit is also operative to provide a color value of a desired position, the desired position is selected from the determined position and a position other than the determined position.

28 Claims, 2 Drawing Sheets

SYSTEM AND METHOD FOR COLOR MEASUREMENT AND CONTROL ON-PRESS DURING PRINTING

FIELD OF THE INVENTION

The present invention relates to a system and method for color measurement and control on-press during printing generally and more particularly to a color measurement and control system and method capable of determining on-press during printing a position of a location of the printed substrate in which a color value measurement is performed.

BACKGROUND OF THE INVENTION

One of the major factors governing the quality of a printed substrate printed by a printing press is its color quality, also termed color fidelity. Color fidelity refers to the consistent appearance of a color throughout a job production and to the consistent appearance of colors across and/or along any part of the printed substrate.

Generally speaking, color measurement and control systems are divided into two categories, off-press and on-press. Off-press or off-line color measurement and control systems are operative to measure periodically or at the printing press operator's request colors of the printed substrate off-press, i.e. not during printing and while the printed substrate is removed from the printing press. Examples of off-press color measurement and control systems are described in U.S. Pat. Nos. 4637728, 5182721, 4671661, and 4963028 and 5,163,012.

Off-press color measurement and control systems suffer from many disadvantageous. One major disadvantage is that since the printing process is fast offpress color values measurements which are inherently slow are not sufficient in order to meet strict color fidelity quality control routines.

On-press color measurement and control systems are operative to measure color values on-press during printing. Examples for prior art on-press color measurement and control systems are described in U.S. Pat. 4712918 and 5125037. These prior art systems require for their operation special color marks, color bars or colors strips to be printed on the sides of the image to be printed on the printed substrate. The color measurement is then performed on these marks.

The employment of color marks, strips or bars has many disadvantages, some of which are listed below.

Special color marks, strips or bars occupy expensive printing substrate space. Moreover, subsequently they have to be removed employing special cutting procedures in order to separate them from the image on the substrate to be printed. Furthermore, measurements done on these marks do not always reflect the color values of the image itself, and it is the color fidelity of the image itself which is of interest.

U.S. Pat. Nos. 5224421, 5357448 and 5460090 describe color measurement and control systems which perform color value measurements on the image printed on the printing substrate. Generally speaking, the systems described in these patents measure colors in predetermined positions of the printed substrate.

However, since the position of the printed substrate with respect to the printing press is not fixed due, for example, to lateral movements, stretching or skewing thereof, it is difficult to measure the color in the desired predetermined position and the color is measured in a location other than the desired predetermined position.

SUMMARY OF THE INVENTION

An object of the present invention is to provide an improved color measurement and control system operative during on-press printing.

Yet another object of the present invention is to provide a color measurement and control system which provide the position of a location in which a color measurement of a printed substrate is made on-press during printing.

An object of the present invention is to provide a color measurement and control system for determining the color of a printed substrate on-press during printing.

The term on-press refers throughout the specification and claims to a process which occurs while a printed substrate is mounted on a printing press. The term during printing refers to a process which takes place while the printing press is in operation.

The term location and position refers throughout the specification and claims to the spatial representation of a color measurement without reference to a coordinate system and in a reference coordinate system, respectively.

Another object of the present invention is to provide an improved method for determining the color of a printed substrate during printing, on-press.

There is thus provided, in accordance with a preferred embodiment of the present invention a method for determining, on-press during printing, the color value of at least one location on a printed substrate, the method includes the steps of: A. acquiring an image of an area of the substrate; B. substantially simultaneously with the acquiring, measuring a color value of a location. Preferably, but not necessarily, the location is within the image; and C. determining a position of the location with respect to the image employing the image.

In accordance with a preferred embodiment of the present invention, the method also includes the step of providing a color value of a desired position, the desired position is selected from the determined position and a position other than the determined position.

Further, according to a preferred embodiment of the present invention, the method also includes the step of illuminating the area during the acquiring. Preferably, the illumination is continuous illumination or flash illumination. Still further, the method may also include the step of measuring the color values of the illumination and correcting it in accordance with a desired illumination.

In accordance with a preferred embodiment of the present invention, the area is determined interactively or automatically.

According to one preferred embodiment of the present invention, the image is a black and white image. Alternatively, it is a color image which is represented in a color space selected from the group of an RGB color space, CMYK color space and XYZ color space.

Further, according to a preferred embodiment of the present invention, the measuring one or more of a spectral measurement, calorimetric measurement and densitometric measurement. Preferably, the measuring provides a color value of the position in an L*A*B* color space.

Still further, the measuring step may include the measuring of a color value of a plurality of locations substantially simultaneously.

Additionally, according to a preferred embodiment of the present invention, the method may include the step of providing includes one or more of ink control instructions based on the color measurement of the position, an alarm to a press operator that the color value of the position deviates from a desired color value and reports regarding the color fidelity of the press.

There is also provided, in accordance with a preferred embodiment of the present invention, a color measurement and control system for determining on-press during printing, the color value of at least one location on a printed substrate, which includes: A. a camera, preferably but not necessarily a video camera, for acquiring an image of an area of the printed substrate; B. at least one color measurement device for measuring a color of a location of the printed substrate, the color measurement device and the camera are operating substantially simultaneously; and C. a processing unit for receiving the image captured by the camera and the color measurement and for determining a position of the location with respect to the image employing the image.

In accordance with a preferred embodiment of the present invention, the system also provides a color value of a desired position, the desired position is selected from the determined position and a position other than the determined position.

Additionally, according to a preferred embodiment of the present invention, the system also includes an illumination system for illuminating the area during the acquiring. The illumination system may be a flash illumination system or a continuous illumination system.

Further, in accordance with a preferred embodiment of the present invention, the camera and the color measurement device are coupled, the coupling therebetween is selected from the group of mechanical coupling and electronic coupling.

According to a preferred embodiment of the present invention, the image is a black and white image. Alternatively the image is a color image which is preferably represented in a color space selected from the group of an RGB color space, CMYK color space and XYZ color space.

Further, according to a preferred embodiment of the present invention, the color measurement device is selected from the group of a spectrophotometer, calorimeter and densitometer and provide a color value of the position in an L*A*B* color space.

According to a preferred embodiment of the present invention, the at least one color measurement device include a plurality of color measurement devices operative to measure a color value of a plurality of locations substantially simultaneously. Alternatively or in addition, the at least one color measurement device includes at least a first color measurement devices for measuring the color value and a second color measurement device for measuring a color value of the illumination of the illumination device.

Finally, in accordance with a preferred embodiment of the present invention, the processing unit is also operative to provide a selected one from the group of ink control instructions based on the color measurement of the positions, an alarm to a press operator that the color value of the position deviates from a desired color value and reports regarding the color fidelity of the press.

BRIEF DESCRIPTION OF THE DRAWINGS

The present invention will be understood and appreciated more fully from the following detailed description taken in conjunction with the appended drawings in which.

DETAILED DESCRIPTION OF THE PRESENT INVENTION

Figure 1:
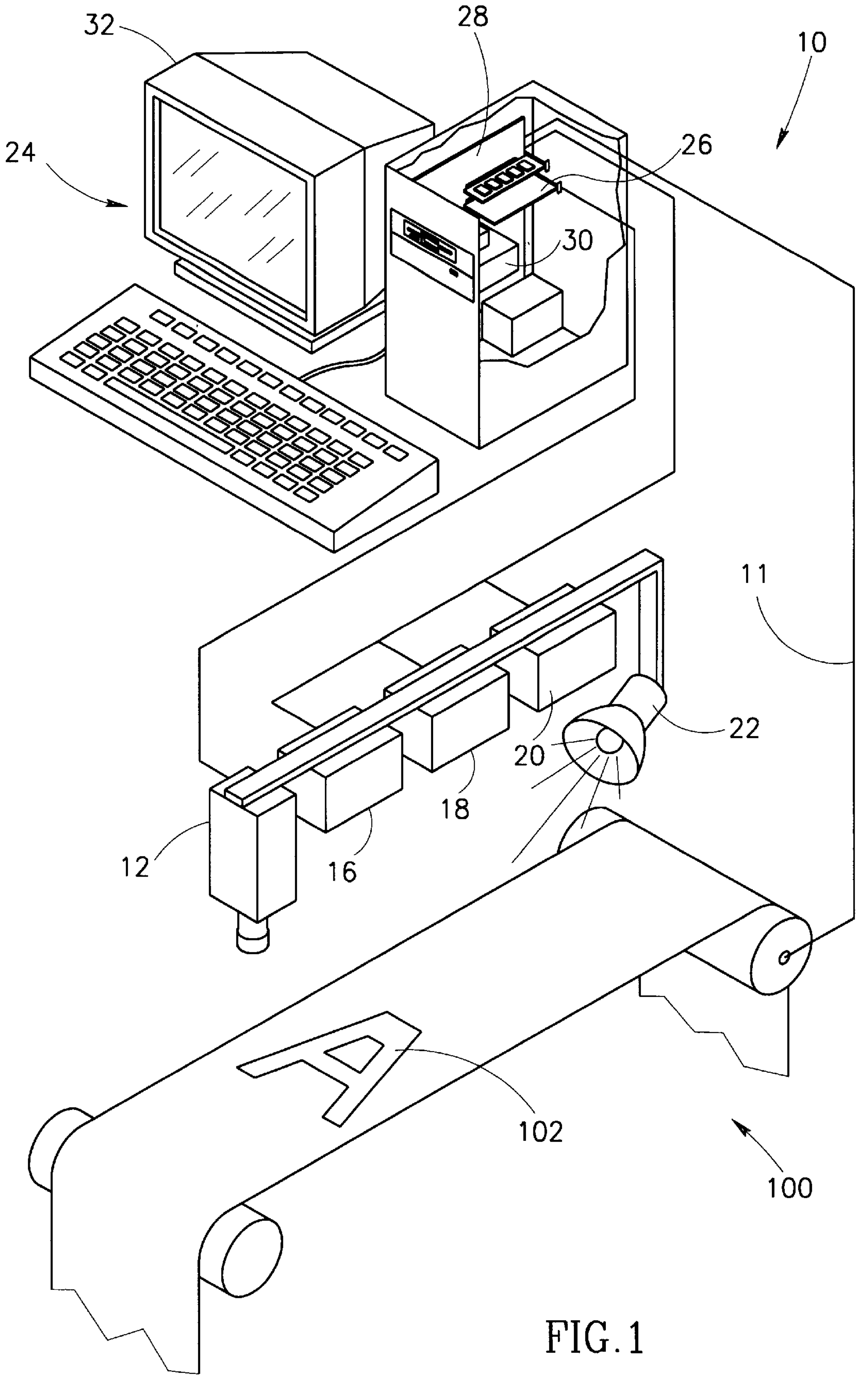
FIG. 1 is a schematic pictorial illustration of a color measurement and control system, constructed and operative in accordance with a preferred embodiment of the present invention.

Reference is now made to FIG. 1 which illustrates a color measurement and control system, generally referenced 10, constructed and operative in accordance with a preferred embodiment of the present invention. Color measurement and control system 10 is operative to determine the color value of at least one location of a printed substrate 102 on-press during actual operation of printing press 100.

In a preferred embodiment the system operates to measure a color value of a location of the printed substrate and to provide its position with respect to an image of an area of the printed substrate.

Color measurement and control 10 is preferably connected to a printing press so as to synchronize therewith and to provide ink regulation control instructions thereto as indicated by reference numeral 11. Printing press 100 may be any printing press known in the art. It may be a conventional press, such as lithographic, gravure or flexo printing press or a digital printing press, such as a digital offset press. Also it may be a web printing press as illustrated in FIG. 1 or a sheet fed printing press.

Color measurement and control system 10 comprises a camera 12, such as a video camera, coupled to at least one color measurement device 16, such as a spectrophotometer, a calorimeter or a densitometer, and a light source 22. Color measurement and control system 10 also comprises a processing and control unit 24 which includes an image buffer 26, a CPU 28, a memory 30, such as a hard disk and a monitor 32.

Camera 12 may be any suitable camera which captures images, such as the DXC - 930 manufactured and sold by Sony of Japan. In a preferred embodiment, video camera 12 includes a two-dimensional color CCD operative to capture images in a Red, Green, Blue (RGB) color space. Alternatively, it may be based on a linear CCD array and/or may be operative in black and white or in any other suitable color space, such as Cyan, Magenta, Yellow & Black (CMYK) color space or XYZ color space.

Color measurement device 16 is operative to receive light reflected from printed substrate 102 during illumination. In a preferred embodiment, color measurement device 16 is a spectrophotometer operative to measure the color value of a location on printed substrate 102 in a L*A*B* color space. A suitable spectrophotometer is the PC-1000, commercially available from Ocean Optics Inc. of Florida, U.S.A.

Light source 22 may be any suitable light source, such as N-108, commercially available from Drello GmbH Munchengladbach, Germany. In the preferred embodiment, light source 22 is operative to provide flashes of lights which are reflected from substrate 102 and detected by color measurement device 16. Alternatively, light source 22 is operative in a continuous mode.

As a non limiting example, processing and control unit 24 is illustrated in FIG. 1 as a computer, such as an International Business Machine (IBM) compatible personal computer having a CPU, such as an Intel Penthium Pro, a hard disk, a video card and a monitor.

In operation, processing and control unit 24 employs camera 12 to acquire an image of an area of printed substrate 102. Substantially simultaneously with the operation of camera 12, color measurement device 16 makes a color measurement of a location of the printed substrate 102.

In a preferred embodiment, the location is within the area of the acquired image. Alternatively, the location of the color measurement is not within the area of the color image.

In the illustrated embodiment, camera 12, color measurement device 16 and light source 22 are mechanically coupled therebetween and move together over the printed substrate 102. Therefore, once an area in which an image is to be acquired is defined, the position of that location is determined.

Preferably, camera 12 with color measurement device 16 and light source 22 coupled thereto form part of a location system. The location system is preferably a visual based location system which operates in two modes, interactively and automatically. In the interactive mode, the press operator interactively selects the area in which an image is to be acquired based on an image of the printed substrate 102 displayed to him on display 32. In the automatic mode, the location system determines the area in which an image is to be acquired automatically. A suitable location system operative in these two modes of operation is the PV-9000 automatic press inspection system, commercially available from Advanced Vision Technologies (AVT) Ltd. of Herzlia, Israel.

Camera 12, color measurement device 16 and light source 22 may also be coupled electronically, i.e. the relative spatial relationship therebetween is stored by processing and control unit 24. In operation, unit 24 employs camera 12 to provide an image and substantially simultaneously to provide an indication to the color measurement device 16 to measure a color value of its current location. Processing unit 24 is then being employed to provide the position of the location in which the color measurement was made in the reference coordinate system in which the area of the acquired image is provided based on the image itself and the camera 12 spatial relationship with color measurement device 16.

It will be appreciated that according to the present invention, the location system provides the area of the acquired image whereas the image enables to determine the exact position of the location of the color value measurement in the reference coordinate system.

It will further be appreciated that the reference coordinate system in which the acquired image is represented may be any suitable coordinate system. In a preferred embodiment, the press and the color measurement and control system are synchronized and using the same coordinate system to indicate absolute positions in a Cartesian coordinate system.

Figure 2:
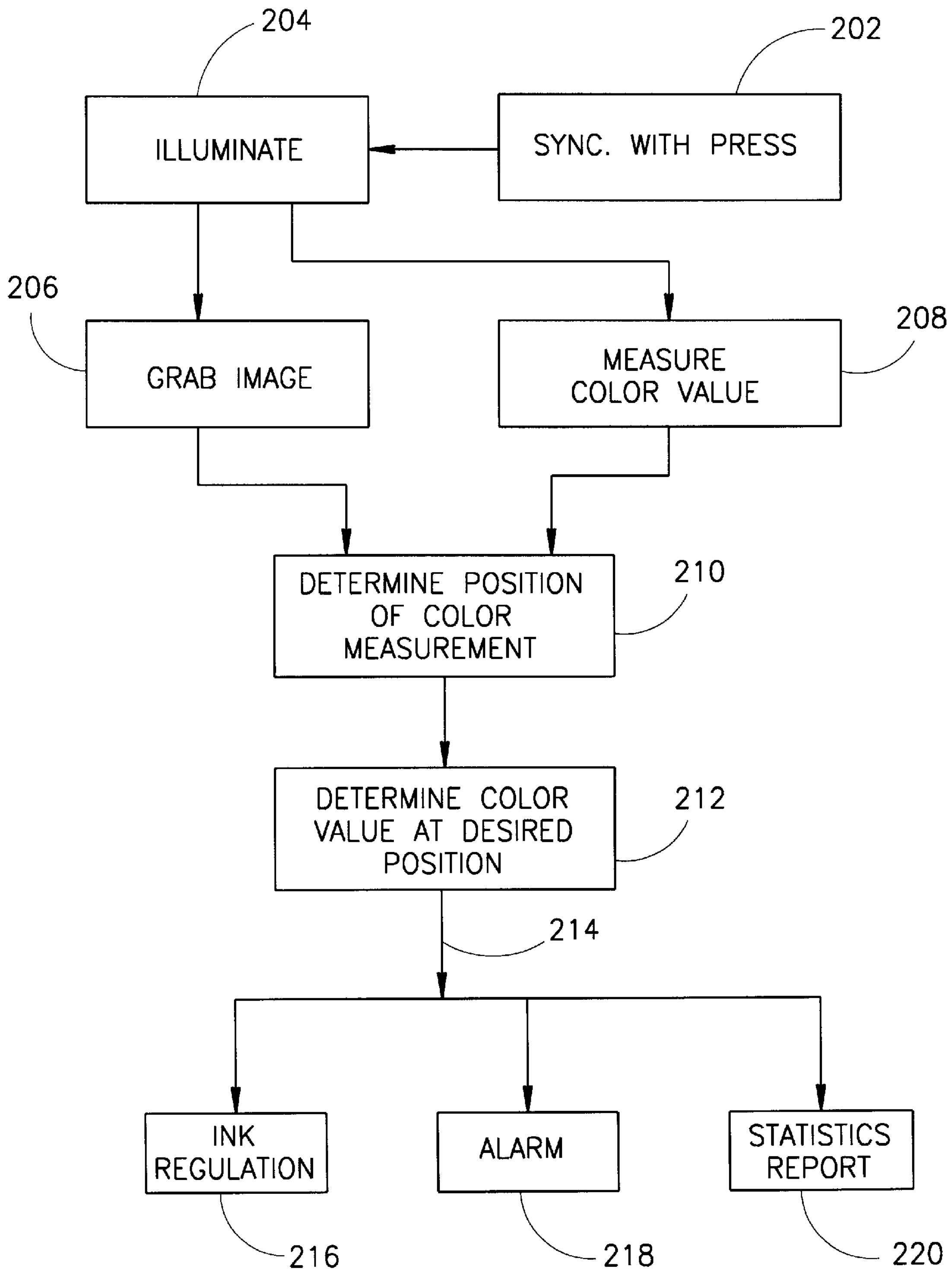
FIG. 2 is a schematic block diagram illustration of a preferred method for employing the color measurement and control system of FIG. 1.

Referring now to FIG. 2, a preferred method for operating the color measurement and control system 10 is illustrated. The method of FIG. 2 starts with a synchronization step 202 in which the processing and control unit 24 is synchronized with the current state of printing press 100. Color measurement and control system 10 is operative on the flight, i.e. while printing press 100 actually prints the printed substrate 102. Hence, the synchronization enables processing unit 24 to locate camera 12 over desired locations for on-line color measurements.

Once the press 100 and color measurement and control system 10 are synchronized and camera 12 is located in the desired area, processing and control system 24 instructs light source 22 if it operates in the flash mode of operation to illuminate the printed substrate 102 as indicated by 204.

Once printed substrate 102 is illuminated, camera 12 is operative to grab images of printed substrate 102 in a normal video rate, i.e. 30 frames per second as indicated in 206. The grabbed images are transmitted to the image buffer of processing and control unit 24 which provides their position in the reference coordinate system.

Substantially simultaneously with step 206, color measurement device 16 receives the light reflected from the measured location of printed substrate 102 and performs a color value measurement of that location as indicated by step 208. For example, in the case color measurement device 16 is a spectrophotometer, the spectrophotometer reads the spectrum of light reflected from the measured location of the printed substrate 102, preferably in an L*A*B* color space.

At step 210, processing unit 24 determines the position of the location in which the color measurement was taken (step 208). According to a preferred embodiment of the present invention, since camera 12 and color measurement device 16 are coupled mechanically or electronically therebetween, processing unit 24 readily provides the position of the color measurement location in the grabbed image coordinate system.

Alternatively, or in addition thereto, the position of the grabbed image may be provided in a reference image coordinate system. In this case the position of the color measurement location is determined by determining the deviations, if any, of the grabbed image from the reference image stored in memory 30. Since camera 12 and color measurement device 16 are coupled therebetween, the position of the color measurement in the reference image coordinate system is deduced from the determined deviations of the grabbed image from the reference image.

At step 212, the color value of a desired position is provided. The desired position may be the position of the location in which the color measurement was taken (step 208), thus the color value of the desired position is readily provided.

The desired position may also be in a distance from the determined position (step 210). In this case, the L*A*B* value of the determined position is also assigned to the desired position provided that the RGB values of the determined position and the desired position are substantially similar.

Alternatively, the L*A*B* value of the desired position is deduced from the L*A*B* value of the determined position in accordance with the change between the RGB values of the desired position and the determined position.

The system may also interactively or automatically repeat the process from step 202 so as to reach a second determined position for deducing the L*A*B* value in the desired position according to the L*A*B* value thereof.

The L*A*B* color value of the desired position on printed substrate 102 is hence provided as indicated by arrow 214 and the information may be stored by processing and control unit 24 for any desired use. In a preferred embodiment, the L*A*B* values of the measured location are used for one or more of the following uses: A. to provide color correction (i.e. ink regulation) instructions to press 100 as indicated by 216, e.g. to change the amount of ink in order to correct the color values of the printed ink so as to match that of the reference image (e.g. the proof image); B. to provide an indication if the determined color value is different from a desired color for the measured location, e.g. to alarm the press operator if the color is significantly different from a desired one as indicated by 218; and C. to provide reports indicating the quality of the printing process, e.g., the number of times the printed color is off the desired color as indicated by 220.

It will be appreciated that the method of FIG. 2 may be repeated for any desired number of locations so as to determine their color in the L*A*B* color space and to provide their exact position within the reference coordinate system. The present invention also enables to deduce the color not only of the measured location, but also of its vicinity.

It will be appreciated that the preferred embodiments described hereinabove are described by way of example only and that numerous modifications thereto, all of which fall within the scope of the present invention, exist. For example, referring again to FIG. 1 there are shown an additional color measurement devices 18 and 20 which represent any additional number of color measurement devices. Color measurement devices 18 and 20 may be employed in any of the following manners. They may be employed to provide a densitometric and a colorimetric measurements of the same location measured by color measurement device 16 which may be a spectrophotometer. They may be employed to measure similar color measurement, say spectrophotometric measurement, of a plurality of locations simultaneously or in any combination therebetween, i.e. more than one type of color measurement in more than one location. Also, one or more of color measurement devices 18 and 20 may be employed to measure the illumination provided by light source 22 so as to enable to correct the color values of light source 22 in case of a deviation from desired color values of the illumination.

It will be appreciated by persons skilled in the art that the present invention is not limited by what has been particularly shown and described herein above. Rather the scope of the invention is defined by the claims which follow:

We claim:

1. A method for determining, on-press during printing without using a color patch the color value of a location on a substrate being printed, the method comprising:

acquiring an image of an area of an image being printed on said substrate;

substantially simultaneously with said acquiring, measuring a color value of said location; and determining a position of said location with respect to said acquired image by employing said acquired image.

2. A method according to claim 1 wherein said location is within said area.

3. A method according to claim 1 further comprising the step of providing a color value of a desired position, said desired position is selected from said determined position and a position other than said determined position.

4. A method according to claim 1 further comprising the step of illuminating said area during said acquiring.

5. A method according to claim 4 wherein said illuminating is selected from the group consisting of continuous illumination and flash illumination.

6. A method according to claim 1 wherein said area is determined interactively or automatically.

7. A method according to claim 1 wherein said printed image is a black and white image.

8. A method according to claim 1 wherein said printed image is a color image.

9. A method according to claim 8 wherein said color image is represented in a color space selected from the group consisting of an RGB color space, CMYK color space and XYZ color space.

10. A method according to claim 1 wherein said measuring comprises a selected one from the group consisting of a spectral measurement, colorimetric measurement and densitometric measurement.

11. A method according to claim 10 wherein said measuring provides a color value of said location in an L'A'B color space.

12. A method according to claim 4 further comprising the step of measuring the color values of said illumination and correcting it in accordance with a desired illumination.

13. A method according to claim 1 wherein said measuring including measuring a color value of a plurality of locations substantially simultaneously.

14. A method according to claim 1 further comprising the step of providing a selected one from the group consisting of ink control instructions based on said color measurement of said positions, an alarm to a press operator that said color value of said position deviates from a desired color value and reports regarding the color fidelity of said press.

15. A color measurement and control system for determining during printing, on press without using a color patch the color value of at least one location on a substrate being printed, comprising:

a camera for acquiring an image of an area of an image being printed on said substrate;

at least one color measurement device for measuring a color of said location, said color measurement device and said camera being operated substantially simultaneously; and processing unit for receiving said image captured by said camera and said color measurement and for providing a position of said location with respect to said acquired image by employing said acquired image.

16. A system according to claim 15 wherein said processing unit is also operative to provide a position and color value of any desired location.

17. A system according to claim 15 wherein said camera is a video camera.

18. A system according to claim 15 further comprising an illumination system for illuminating said area during said acquiring.

19. A system according to claim 18 wherein said illumination system is a flash illumination system or continuous illumination system.

20. A system according to claim 15 wherein said camera and said color measurement device are coupled, the coupling therebetween is selected from the group consisting of mechanical coupling and electronic coupling.

21. A system according to claim 15 wherein said printed image is a black and white image.

22. A system according to claim 15 wherein said printed image is a color image.

23. A method according to claim 22 wherein said color image is represented in a color space selected from the group consisting of an RGB color space, CMYK color space and XYZ color space.

24. A system according to claim 15 wherein said color measurement device is selected from the group consisting of a spectrophotometer, calorimeter and deneitometer.

25. A system according to claim 23 wherein said color measurement device provides a color value of said location in an L'A'B color space.

26. A system according to claim 15 wherein said at least one color measurement device comprises a plurality of color measurement devices operative to measure a color value of a plurality of locations substantially simultaneously.

27. A system according to claim 18 wherein said at least one color measurement device comprised at least a first color measurement devices for measuring said color value and a second color measurement device for measuring a color value of the illumination of said illumination system.

28. A system according to claim 15 wherein said processing unit is also operative to provide a selected one from the group consisting of ink control instructions based on said color measurement of said positions, an alarm to a press operator that said color value of said position deviates from a desired color value and reports regarding the color fidelity of said press.

* * * * *